United States Patent
Stickley et al.

(10) Patent No.: US 7,714,765 B2
(45) Date of Patent: May 11, 2010

(54) SYNTHETIC APERTURE PERIMETER ARRAY RADAR

(75) Inventors: Glen Stickley, Brisbane (AU); Dennis Longstaff, Brisbane (AU)

(73) Assignee: GroudProbe Pty. Ltd., Queensland (AU)

( * ) Notice: Subject to any disclaimer, the term of this patent is extended or adjusted under 35 U.S.C. 154(b) by 256 days.

(21) Appl. No.: 11/988,819

(22) PCT Filed: Oct. 17, 2006

(86) PCT No.: PCT/AU2006/001538

§ 371 (c)(1),
(2), (4) Date: Jan. 15, 2008

(87) PCT Pub. No.: WO2007/045026

PCT Pub. Date: Apr. 26, 2007

(65) Prior Publication Data

US 2009/0033556 A1    Feb. 5, 2009

(30) Foreign Application Priority Data

Oct. 17, 2005    (AU) .............................. 2005905715

(51) Int. Cl.
*G01S 13/00*    (2006.01)
(52) U.S. Cl. .................... 342/25 R; 342/25 F; 342/175; 342/195
(58) Field of Classification Search .................. 342/22, 342/25 R, 25 A, 25 B, 25 C, 25 D, 25 E, 342/25 F, 175, 195, 196
See application file for complete search history.

(56) References Cited

U.S. PATENT DOCUMENTS

| 3,685,051 | A | * | 8/1972 | Wells | 342/179 |
| 3,881,164 | A | * | 4/1975 | Kossoff | 367/138 |
| 4,671,293 | A | * | 6/1987 | Shaulov | 600/447 |
| 4,870,867 | A | * | 10/1989 | Shaulov | 73/625 |
| 6,664,914 | B2 | * | 12/2003 | Longstaff et al. | 342/22 |
| 6,850,183 | B2 | * | 2/2005 | Reeves et al. | 342/22 |

OTHER PUBLICATIONS

"Virtual array synthesis method for planar array antennas", Vaskelainen, L.I., VTT Inf. Technol. Telecommun.; Antennas and Propagation, IEEE Transactions on, Mar. 1998, vol. 46, Issue: 3, pp. 391-396.*
Synthetic aperture imaging with arrays of arbitrary shape. II. The annular array Norton, S.J., Geophex Ltd., Raleigh, NC, USA; Ultrasonics, Ferroelectrics and Frequency Control, IEEE Transactions on, Publication Date: Apr. 2002, vol. 49, Issue: 4, pp. 404-408.*
Coarray synthesis with circular and elliptical boundary arrays, Kozick, R.J. Kassam, S.A. , Dept. of Electr. Eng., Pennsylvania Univ., Philadelphia, PA;, Image Processing, IEEE Transactions on, Jul. 1992, vol. 1, Issue: 3, pp. 391-405.*

* cited by examiner

*Primary Examiner*—Isam Alsomiri
*Assistant Examiner*—Peter M Bythrow
(74) *Attorney, Agent, or Firm*—Howard & Howard Attorneys PLLC

(57) ABSTRACT

A perimeter antenna array for a radar, in particular a slope monitoring radar, formed from a pair of parallel linear arrays of receiver elements and a pair of parallel linear arrays of receiver elements, together forming a rectangle of receiver and transmitter elements. Signals are switched to the transmitter elements and received by the receiving elements. The signals are processed to obtain signals for virtual elements located equidistant between transmitting and receiving elements. The signals from the virtual elements are analyzed to produce a radar image.

19 Claims, 6 Drawing Sheets

SYNTHETIC APERTURE PERIMETER ARRAY RADAR

This invention relates to synthetic aperture perimeter array radar. In particular, it relates to a perimeter antenna array for perimeter element radar useful for slope monitoring applications.

BACKGROUND TO THE INVENTION

In our earlier granted patent, U.S. Pat. No. 6,850,183, we describe a slope monitoring system based on interferometric radar measurements. The radar employs a mechanically scanned dish antenna to achieve azimuth and elevation coverage. The radar described in our earlier patent used a 0.92 m diameter parabolic dish mounted on a sturdy tripod and controlled by separate motors and gears for azimuth and elevation movement.

It has been found that the mechanical scanned dish antenna is a source of mechanical instability so an alternate system is required. Furthermore, the mechanical scanning equipment has a large power requirement that is provided by a generator, thus increasing the size and cost of the radar. There are practical limits on the size of a mechanically scanned dish for slope monitoring applications so for long range applications or higher resolution applications an alternative is needed.

Synthetic aperture imaging with circular and elliptical boundary arrays has been analysed for acoustic applications by Kozick [Coarray Synthesis with Circular and Elliptical Boundary Arrays; IEEE Trans. Image Processing; Vol 1 No 3 Jul. 1992] and Norton [Synthetic Aperture Imaging with Arrays of Arbitrary Shape—Part II: The Annular Array; IEEE Trans. Ultrasonics, Ferroelectrics and Frequency Control; Vol 49 No 4 April 2002]. Kozick and Norton both reference Norton's earlier paper [Acoustic Holography with an Annular Aperture; J. Acoustic. Soc. Am. Vol 71 No 5 May 1982]. Reference may also be had to a early paper by Milder & Wells [Acoustic Holography with Crossed Linear Arrays; IBM J. Res. Develop. September 1970] which describes the advantages of orthogonal linear arrays of receiver and transmitter elements.

Although not directly applicable to the radar situation the theoretical analysis in these papers provides a useful background for considering a perimeter array as an alternative to the dish antenna.

OBJECT OF THE INVENTION

It is an object of the present invention to provide a perimeter antenna array for a synthetic aperture radar.

Further objects will be evident from the following description.

DISCLOSURE OF THE INVENTION

In one form, although it need not be the only or indeed the broadest form, the invention resides in a perimeter antenna array for a synthetic aperture radar comprising:

at least one linear array of radar transmitter elements;

at least one linear array of radar receiver elements orthogonal to the linear array of transmitter elements;

one or more transmitter switches for switching signals to a selection of said radar transmitter elements;

one or more receiver switches for switching received signals from a selection of said radar receiver elements; and one or more processors for processing the received signals to synthesise virtual elements equidistant from pairs of the transmitter elements and the receiver elements.

Suitably the perimeter antenna array is part of a radar and the one or more processors also analyse the signals associated with said virtual elements to produce radar images.

Preferably the elements in each linear array are equi-spaced but the spacing between transmitter elements may be different from the spacing between receiver elements.

Preferably the radiation patterns of the element antennas match with the desired scan angle of the radar.

The spacing of the antenna elements are suitably chosen in a similar manner to a traditional phased array radar such as to minimise grating lobes across the radar's field of view.

BRIEF DETAILS OF THE DRAWINGS

To assist in understanding the invention preferred embodiments will now be described with reference to the following figures in which.

Figure 7:
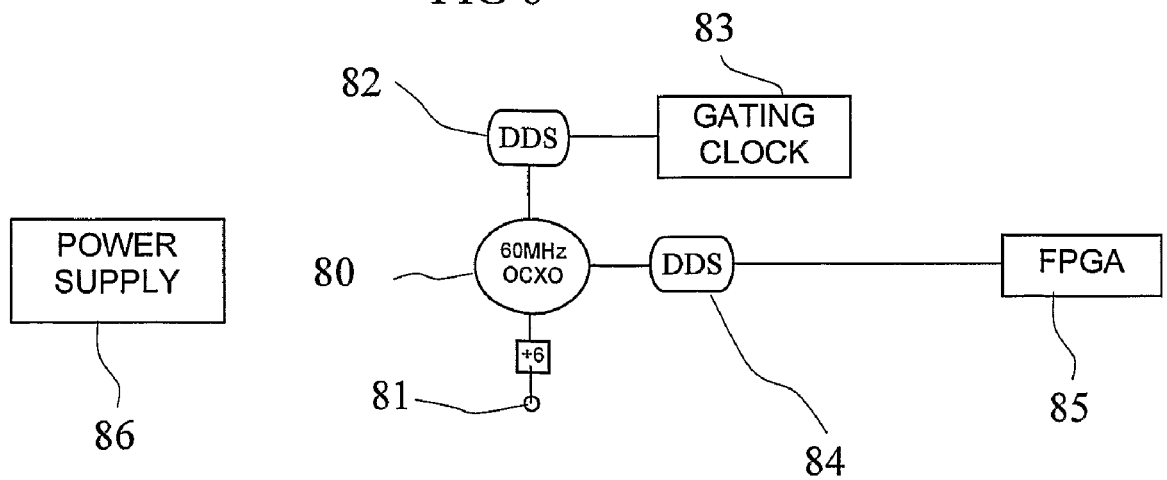
Figure 8:
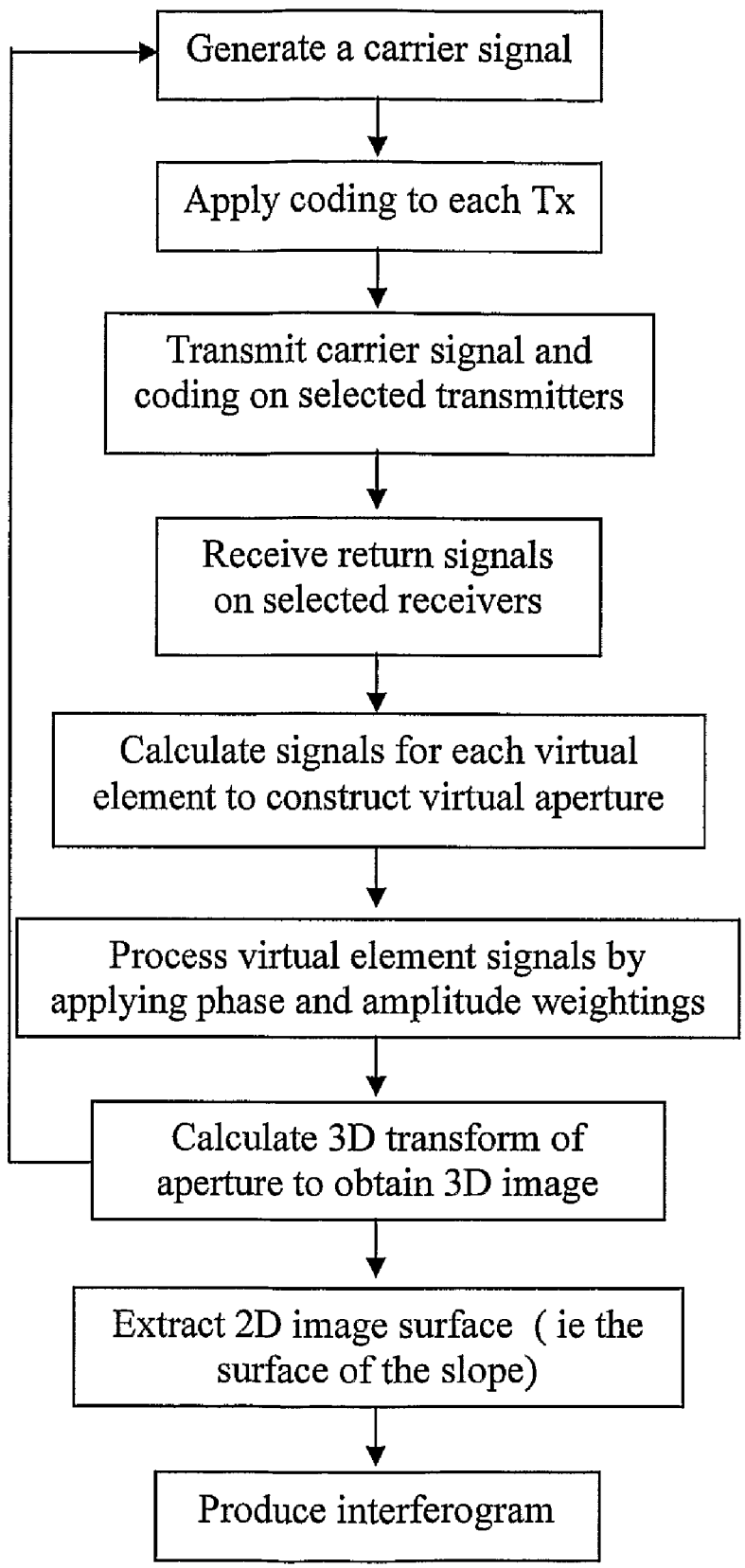
Figure 9:
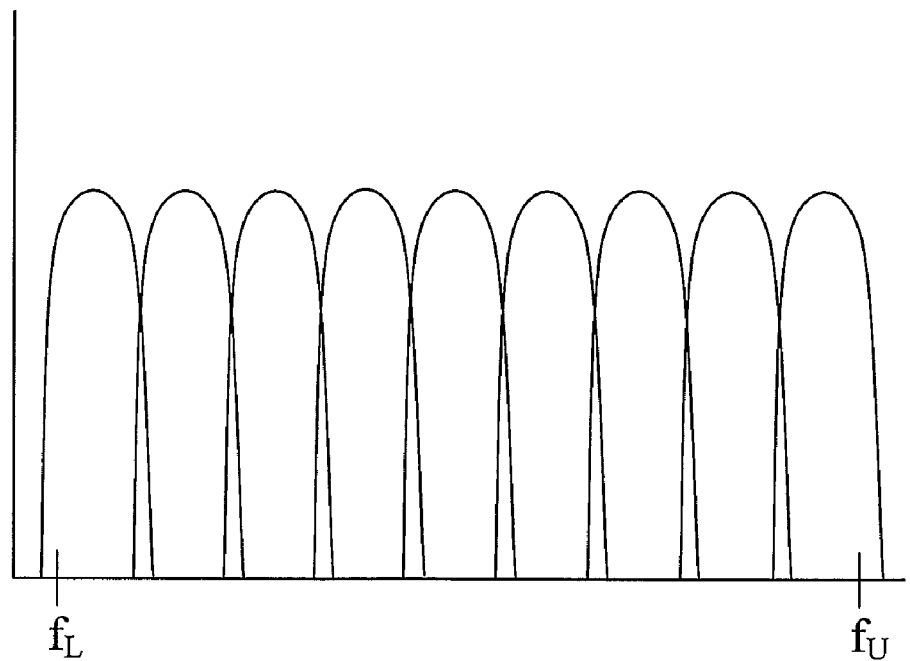
Figure 10:
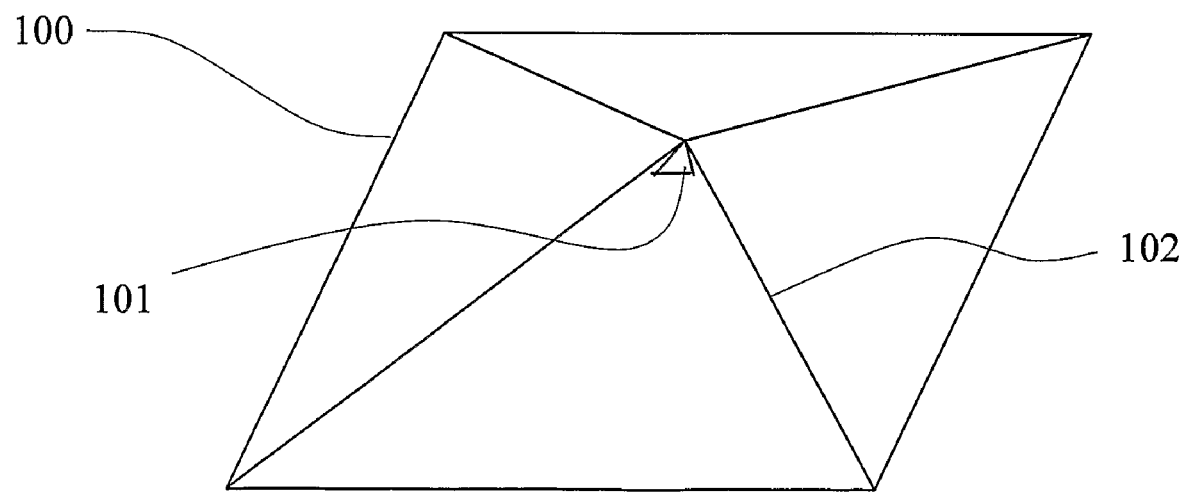
Figure 11:
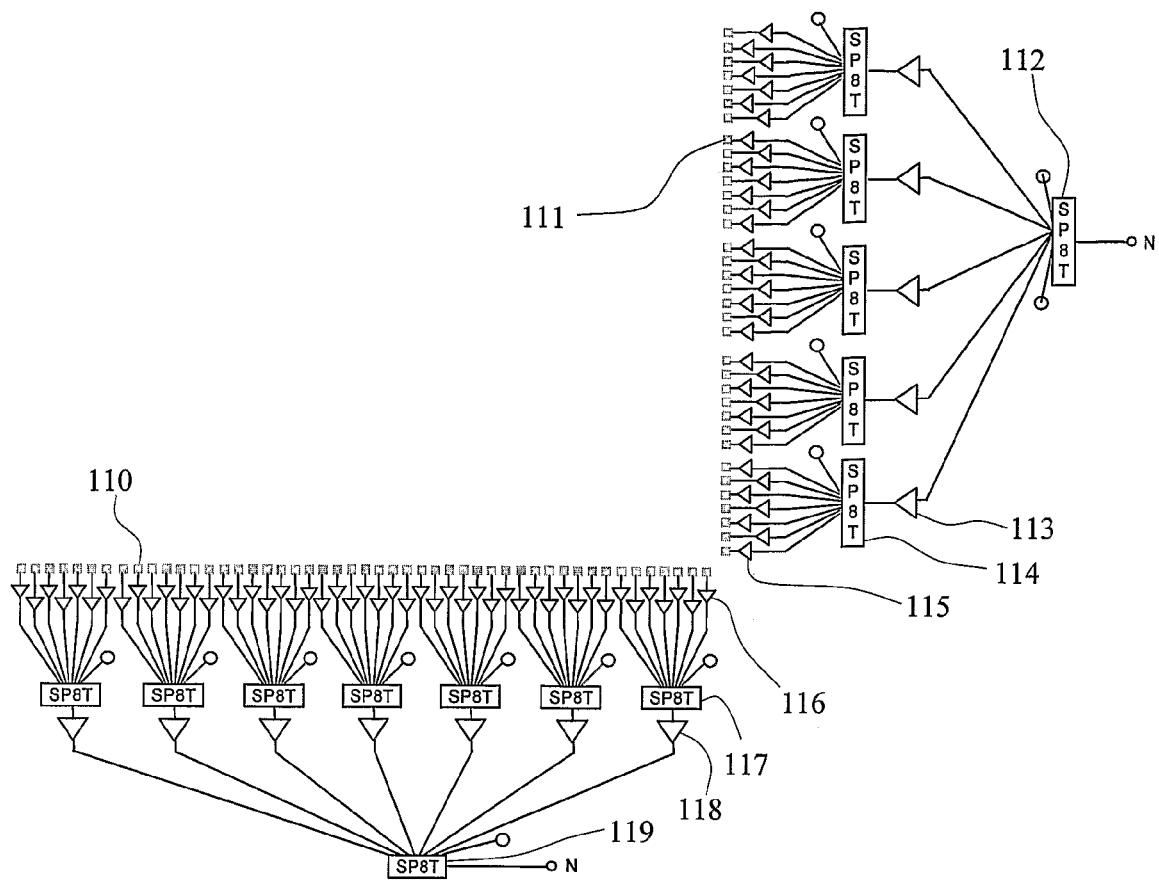
Figure 12:
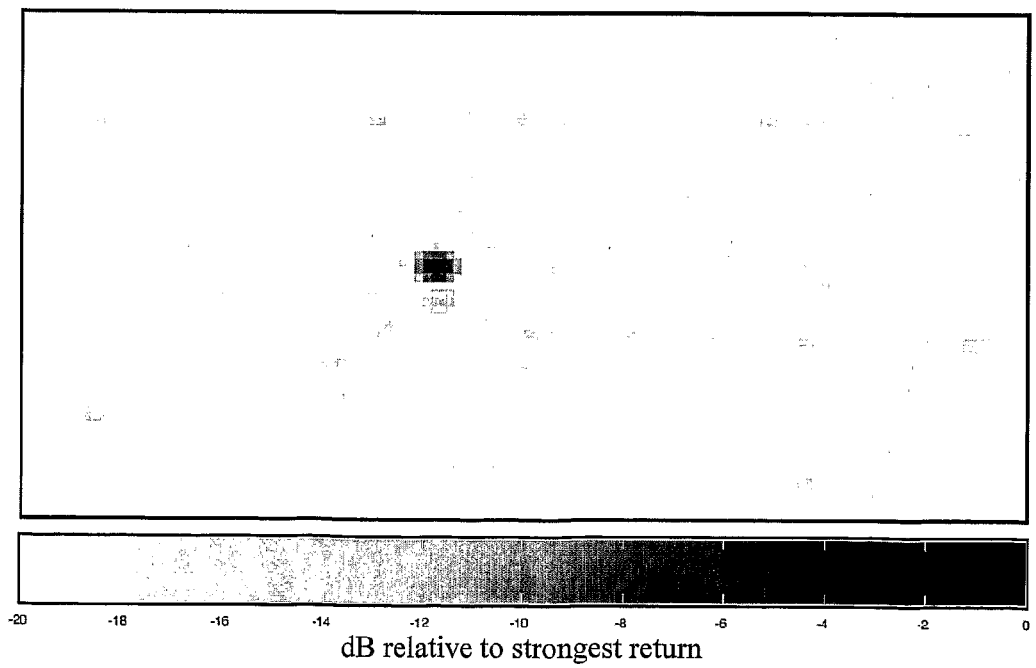

FIG. 7 schematically shows one embodiment of the core electronics;

FIG. 8 is a flow chart of the steps in operation of a synthetic aperture radar employing the perimeter antenna array;

FIG. 9 shows a scheme for frequency stepping across a frequency band;

FIG. 10 shows an arrangement for calibration of the radar;

FIG. 11 shows part of the electronics of an alternate embodiment of a perimeter antenna array; and FIG. 12 shows a radar image taken with the perimeter antenna array of FIG. 11.

DETAILED DESCRIPTION OF THE DRAWINGS

In describing different embodiments of the present invention common reference numerals are used to describe like features.

Figures 1, 2:
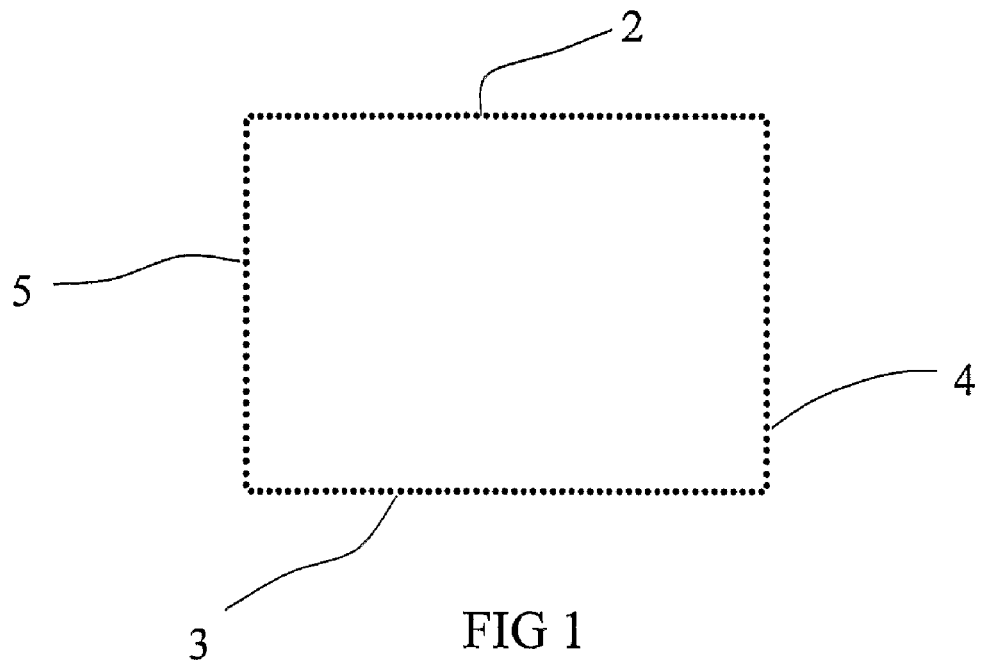
FIG. 1 is a schematic depiction of a perimeter antenna array for synthetic aperture radar.
FIG. 2 depicts the generation of virtual elements.

A first embodiment of a perimeter array antenna for synthetic aperture radar is shown schematically in FIG. 1. The antenna is constructed from a number of receiver elements Rx and transmitter elements Tx. The particular embodiment of FIG. 1 employs transmitter elements along top side 2 and bottom side 3 and receiver elements along right side 4 and left side 5. A typical small scalable array that would be useful for ranges up to several hundred meters (nominally about 650 m) would have dimensions of 0.9 m by 0.7 m and would have fifty-five transmitter elements on each of top side 2 and bottom side 3, and thirty-two receiver elements on each of right side 4 and left side 5. The exact number of elements in the array will depend on a number of factors such as physical size, manufacturing considerations and signal to noise ratio.

The embodiment is shown with transmitter elements on the horizontal sides and receiver elements on the vertical sides but there is no particular reason for this conformation other than receiver electronics generally being more costly than transmitter electronics. In an alternate embodiment described with reference to FIG. 11, the transmitter electronics are more expensive so the transmitter elements are arranged on the vertical side and the receiver elements on the horizontal side. In fact, transceiver elements (capable of receiving and transmitting) could be used in each location. It should be appreciated that a virtue of a rectangular perimeter array is that it allows the separation of transmitter and receiver elements with transmitter elements on one pair of parallel sides and receiver elements on the other pair. With a circular or elliptical perimeter array each element is both a transmitter and receiver or else transmitter elements must be interspersed with receiver elements.

By transmitting on one element and receiving on another element a virtual element is synthesized equi-spaced between each element. By transmitting and receiving on each element pair a virtual filled aperture is synthesized from only perimeter real elements. It is impractical to attempt to show all virtual elements in the antenna of FIG. 1. For ease of description reference is made to a simplified antenna shown in FIG. 2.

FIG. 2 shows a small perimeter array radar with three transmit elements top and bottom and two receive elements left and right. All transmit elements and all receiver elements have a unique subscript. Each virtual element is half way between a transmit element and a receive element. Each virtual element has two subscript characters; the first character identifies the relevant transmit element and the second character identifies the relevant receive element. Thus $V_{1B}$ is halfway between $T_1$ and $R_B$.

At any give time two transmit elements will be in operation; one from the top and one from the bottom. Similarly at any given time two receive elements will be in operation; one from the top and one from the bottom.

Consider the case of $T_1$ and $T_4$ being in use. Time-shifted versions of the same PN (Pseudo Noise) code are transmitted on each element repetitively. (The PN code is superimposed on a bi-phase modulator on a carrier transmit frequency.) For example, consider a 15 bit long PN code.

$T_1$ code sequence: 111010110010001

$T_4$ code sequence: 001000111101011

Note that the sequence on $T_4$ is advanced by 8 clock cycles compared to the sequence on $T_1$.

Consider one of the active receivers; it will receive returning radar energy from both transmitters. When the received energy is appropriately compressed there will be two peaks, one due to $T_1$ and the other due to $T_4$. The two peaks will be separated by the time shift between the two codes. Thus to achieve an overall radar unambiguous time delay of t, the code sequence must be of period 2*t long. The unambiguous time delay t comes from the repeat period of the transmitted signal. Because in the above example there are effectively two radars the unambiguous time delay is half the repeat period of the transmitted signal. The range resolution by contrast is 1/(bandwidth).

Initially while transmitting on $T_1$ and $T_4$, $R_1$ and $R_A$ will be receiving. Because of the time shift between the codes on $T_1$ and $T_4$ explained in the paragraph above, it is possible to disentangle the energy from the two transmitters. Therefore it is possible to identify the energy received at $R_A$ from $T_1$ for example. This is identified with virtual element $V_{1A}$. The process is repeated for $V_{11}$, $V_{A1}$ and $V_{AA}$.

The process is repeated but signals are instead received on elements $R_2$ and $R_B$. This yields results for $V_{1B}$, $V_{12}$, $V_{A2}$ and $V_{AB}$.

Once sufficient data has been collected on all receivers for the transmit pair $T_1$ and $T_4$ the pair $T_2$ and $T_B$ are used. With these transmit elements in use first the receive pair $R_1$ and $R_A$ will be used and then the receive pair $R_2$ and $R_B$. All together this yields results for another 8 virtual elements.

The last 8 virtual elements are obtained by using the last transmit pair $T_3$ and $T_C$. Once data is collected for all virtual elements the whole process is repeated at an offset carrier frequency. This broadens the band over which there is captured data; and hence increases the range resolution.

Another approach is to use a resampled, bandwidth-limited pseudo-noise code that is passed through a digital-to-analogue converter before combining with a carrier and being applied directly to each element. This approach allows the whole bandwidth to be captured at once. This approach is discussed further below with relation to the channel and core electronics.

The data from all the virtual elements together form a synthetic phased array. Before conventional phased array processing a small phase correction is applied to the virtual elements to correct for the phase errors caused by some virtual elements being halfway between well separated transmit and receive elements and other virtual elements being halfway between closely spaced transmit and receive elements.

A 3D transform (similar to a 3D-FFT) is applied to the data from the virtual elements to obtain range, azimuth and elevation data to image targets. Prior to the transform, amplitude weightings may be applied to the virtual elements to control the beam sidelobes. Similarly phase weighting may be applied, for example to focus the beam in the nearfield. It is important to appreciate that the rectangular perimeter array allows the computationally efficient processing to transform from frequency data for each virtual element to 3D voxels with axes of range, azimuth and elevation. Circular or elliptical perimeters arrays are not amenable to such computationally efficient transforms.

Furthermore, by controlling the phase and amplitude weightings on each element the virtual aperture can be conceptualized as being scanned in azimuth and elevation. A field of view of +/−60 degrees in azimuth and +/−30 degrees in elevation while the perimeter array remains stationary is easily achieved. In reality the radar is not scanned in the common mechanical sense or even in the electronic sense of a normal phased array. Rather, the data from the 3D transform contains all valid combinations of azimuth and elevation angle. The phase weightings applied during signal processing correct for slightly different phase of synthetic elements formed from closely spaced real elements compared to those formed from well separated real elements. Phase weightings also correct for phase errors in the elements, electronics and cables. Phase weightings can also allow short range focusing of the synthetic aperture perimeter array radar. Amplitude weightings can correct for errors in the electronics. The amplitude and phase weightings together can optimize the trade off between resolution and choosing the most desirable sidelobe level.

To achieve a field of view for the perimeter array radar of ±30° in elevation and ±60° in azimuth the 3 dB points of the radiation pattern of the individual antennas should preferably be at ±30° in elevation and ±60° in azimuth. If the element's radiation pattern is narrower than this, there will be very poor returns at the limits of the field of view. If the element's radiation pattern is broader than this, the signal to noise ratio will be poorer than it could be.

Figure 3:
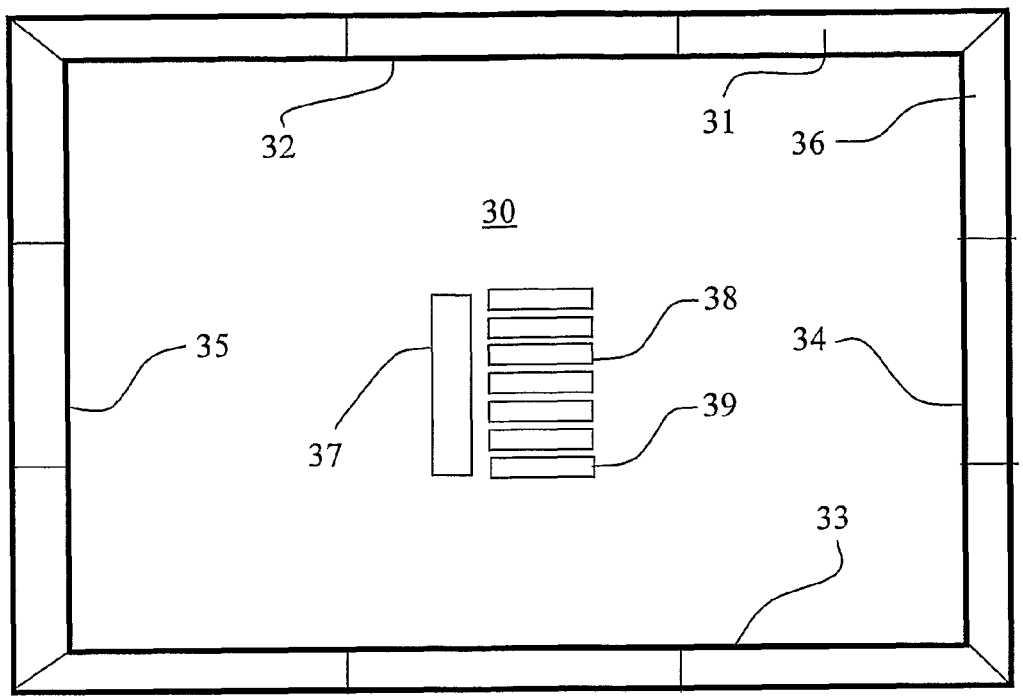
FIG. 3 is a schematic depiction of a larger scale perimeter antenna array based on the antenna of FIG. 1 and showing channel and core electronics.

The small perimeter array shown in FIG. 1 is only useful for small installations at short range. A larger array is shown in FIG. 3 with control electronics. A typical perimeter antenna array for a large installation will have 165 transmitter elements top and bottom and 96 receiver arrays on each side. Each linear array is constructed from a number of sub-arrays and is therefore based upon the small array in FIG. 1. As is evident, the large array uses three small array modules on each side so there are three transmitter sub-arrays 31 along top 32 and bottom 33 and three receiver sub-arrays 36 along right side 34 and left side 35. A perimeter antenna array of this size will have a range measured in kilometers (nominally 2.5 km with current technology).

The large perimeter array and the small perimeter array have the same field of view but different resolution at a given range. The desired resolution at the operating range determines the required aperture of the perimeter array. The number of elements in the perimeter array is variable depending on a number of factors including the timescale of atmospheric effects. For instance, a scan time of 30 seconds is acceptable for the large perimeter array described above. Scan time can be reduced by reducing aperture size while keeping the element spacing constant. This also reduces the resolution.

Signal to noise ratio also needs to be considered. Signal to noise ratio can be improved by operating transmitters and receivers in parallel to increase data collection but this increases hardware costs.

It will be appreciated that the specific number of elements in the array is a design decision taking into account various competing considerations including those mentioned above.

The sub-arrays are designed to be easily connected so that larger antenna arrays may be easily constructed and repaired. FIG. 3 shows the core electronics 37 and channel electronics 38 as discrete elements. It will be appreciated that the specific location of various electronic components is of minor importance.

The cost of circuitry of the receiver and transmitter elements is significant which could make the perimeter array uneconomic for a real system. However, the inventors realize that separate electronics are not required for every element since the signals to and from the elements are processed in a controlled way to control the field-of-view of the virtual elements. It is therefore practical to switch elements to a reduced number of signal processing channels.

Figure 4:
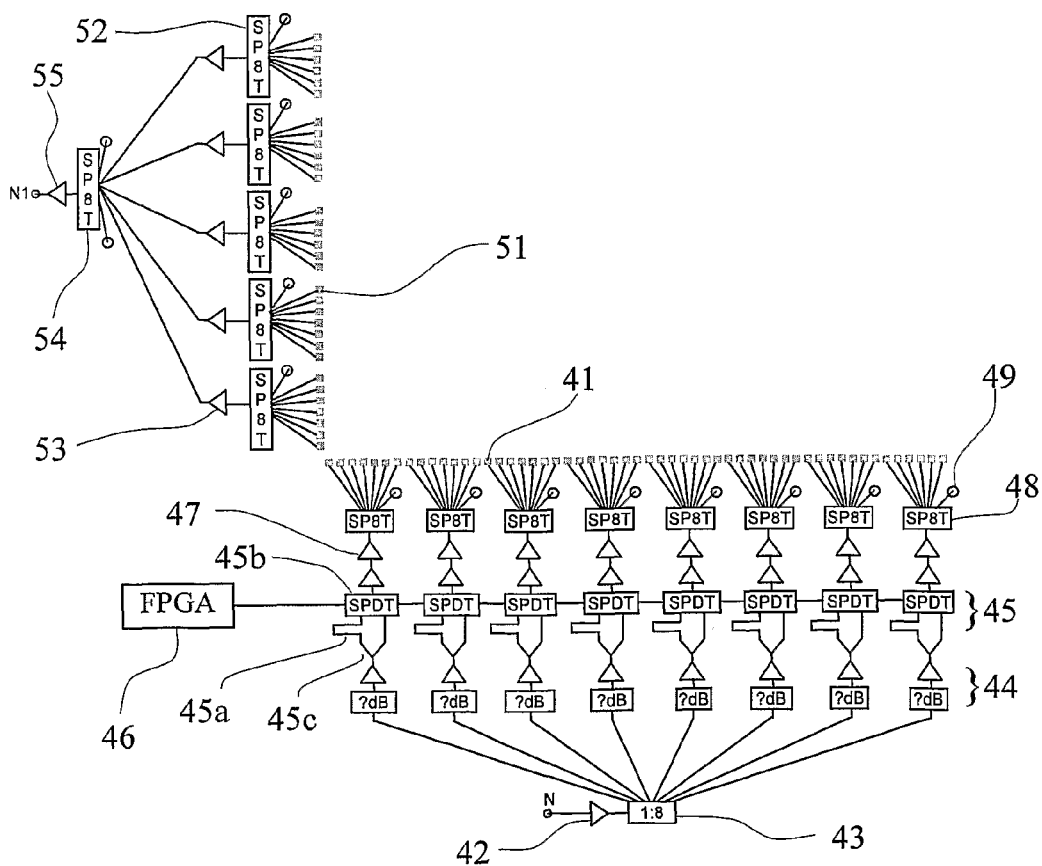
FIG. 4 shows a part of the electronics of FIG. 3 in greater detail.

The major components of one embodiment of the channel electronics is shown in FIG. 4. Each channel provides signals to one transmitter sub-array and receives signals from one receiver sub-array. Thus, as clear in FIG. 3, an antenna with six transmitter sub-arrays and six receiver sub-arrays will have six duplicate sets of channel electronics 38.

In addition, further channel electronics 39 may be provided for a calibration device. The calibration device and process is described in more detail by reference to FIG. 11.

FIG. 4 shows channel electronics for one channel of a perimeter antenna array having fifty-five transmitter elements, such as 41 and thirty-two receiver elements, such as 51. The individual elements are arranged in blocks of seven with one block having one element less to give the desired number of elements. A signal from the core electronics is fed via amplifier 42 to a splitter/switch 43. It is desirable if the device is able to direct an incoming signal to any one or more of the eight outputs. Such a device is difficult to practically realize in a radar so a 1:8 splitter is used to split the incoming signal evenly into eight equivalent channels. Each channel has a variable attenuator and amplifier, such as 44, to set the power delivered to the individual transmitter elements 41.

A binary phase modulator 45 is constructed from a $\lambda/2$ phase delay line 45a, a single pole double throw (SPDT) switch 45b and two way splitter 45c. The SPDT is controlled by applying the binary code to choose between two paths with an electrical path length difference of $\lambda/2$. The SPDT switches are suitably controlled by a field programmable gate array 46, or similar device.

Final stage amplifiers 47 condition the signal before connection to a splitter/switch 48. As discussed above, for maximum versatility of operation it is desirable for the splitter/switch 48 to be able to direct an incoming signal to any one or more of eight outputs. As this is difficult to realize at radar frequencies a single pole eight throw (SP8T) switch is used to select any one of the eight outputs. For a practical device only seven transmitter elements are connected to each switch. The eighth output is used for calibration and set-up purposes. The combination of switches and electronics shown on the transmitter side of FIG. 4 allows a phase shifted code to be applied to a carrier signal which is switched simultaneously to one transmitter element out of each block of transmitter elements. By swapping the 1:8 splitter 43 and the SP8T 48 the electronics would allow the coded signal to be switched sequentially to each block of transmitter elements.

The extra switch position in each SP8T 48 can be used to select a spare port 49 for calibration and test purposes.

Figure 5:
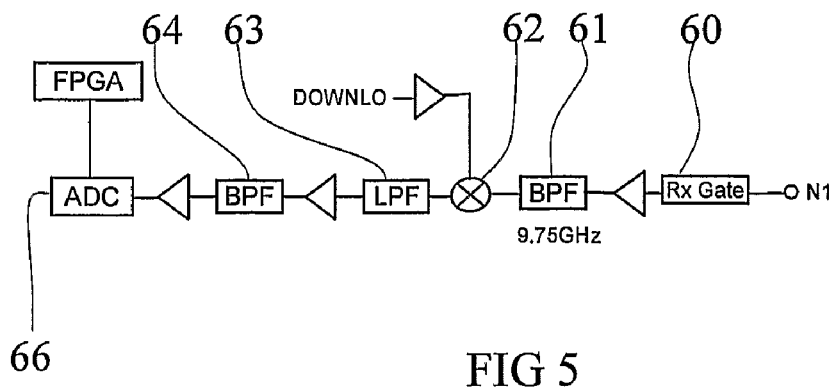
FIG. 5 shows one embodiment of the receiver channel electronics in detail.

Signals received at the receiver elements 51 are switched by SP8T 52 and amplified 53 before being selected by SP8T 54 and amplified 55 before further processing. This combination of switches allows individual receiver elements to be selected for signal processing in the receiver electronics shown in FIG. 5.

The signal from the receiver element is passed through a receiver gate 60 which gates the signal to ensure the radar does not transmit and receive at the same time. A 9.75 GHz bandpass filter 61 minimises spurious signals for a mixer 62. Signal detection is a heterodyne scheme using a DOWNLO signal generated by the core electronics. A combination low pass filter 63 and band pass filter 64 process the signal before digitisation in ADC 66. The extracted signals are analysed in a processor in the manner described above and explained in greater detail by reference to FIG. 8.

Figure 6:
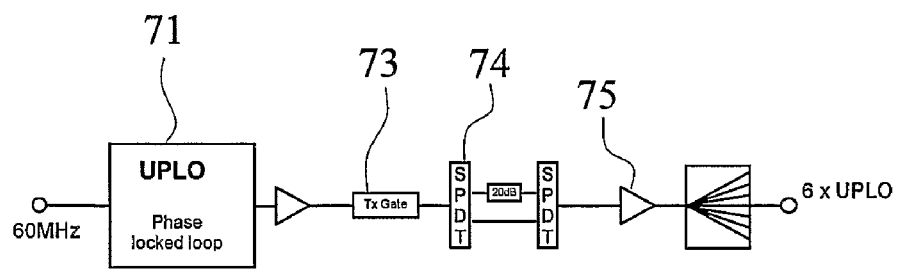
FIG. 6 shows one embodiment of the transmitter channel electronics in detail.
Figure 6:
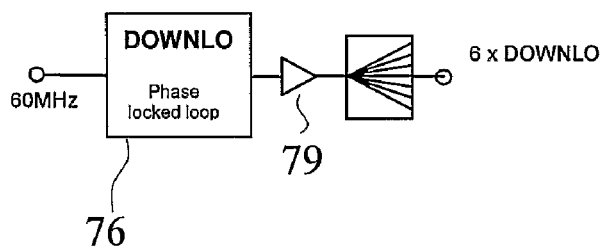

The transmitter electronics are shown in greater detail in FIG. 6. A heterodyne signal detection is employed as indicated in FIG. 6 with the generation of an UPLO and DOWNLO signal. A 60 MHz signal from a master clock 80 (see FIG. 7) is provided as a clock signal reference to the UPLO phase locked loop 71. The UPLO output at 9.75 GHz is amplified and passes transmission gate 73. The partial transmission gate 74 provides selection between two power levels before final amplification 75. This avoids saturating the receiver when the perimeter array radar is being calibrated. Calibration is described further below.

The 60 MHz master signal is also provided to the DOWNLO phase locked loop 76. Final stage amplifier 79 provides conditioning of the DOWNLO signal.

A block schematic of the core electronics is shown in FIG. 7. The master clock 80 generates a master signal at 60 MHz. This is divided by six to produce a 10 MHz signal 81 for locking test instruments. A direct digital synthesizer (DDS) 82 produces a gating clock signal for operation of the transmitter and receiver gates. The master signal at 60 Mhz is also used as input to another digital synthesis process 84 to generate a modulation clock that is distributed from the FPGA 85. A power supply 86 may be a single power supply for all electronics or may be distributed as a number of discrete elements.

The electronics shown in FIGS. 4-7 are one example of suitable electronics for operation of the perimeter antenna array. As mentioned above, the transmission signal may be generated from a resampled, bandwidth-limited, pseudo-noise code which is converted in a digital-to-analogue converter and mixed with a carrier before transmission by the transmitter elements. This approach does not require the variable attenuator and amplifier 44 or binary phase modulator 45 as the appropriate phase and amplitude of the transmission signal is generated in the core electronics. The electronics at each array element are much simpler as seen in FIG. 11.

A primary application of the perimeter antenna array is in a slope stability radar such as described in our earlier patent (International Patent Application WO 02/46790; Granted U.S. Pat. No. 6,664,914). The flow chart of FIG. 8 sets out the top level steps of a method of using the perimeter antenna in a synthetic aperture radar for slope stability measurements.

A carrier signal is generated in an appropriate frequency band as dictated by physical requirements and legislative constraints. A suitable frequency is anywhere in the radiolocation band recognised by many countries between 9.5 GHz and 10 GHz. The binary coding described above is applied to the carrier signal with appropriate phase shift for each operating transmitter and the signals are transmitted towards the slope. Signals reflected from the slope are received at the radar and received signals are read from selected receiver elements.

Virtual element signals are extracted from the received data and the process is repeated until a full synthetic aperture is constructed. In general, the invention will have much lower signal to noise ratio for a given target than a phased array of similar resolution (and similar transmit power per element and similar receiver noise floor) because there are less real elements to transmit upon and less real elements to receive.

The synthetic aperture virtual elements are processed with suitable phase and amplitude weightings. The phase weightings are first applied to correct phase differences between virtual elements formed from widely spaced transmit and receive elements and virtual elements formed from more closely spaced transmit and receive elements. Phase calibrations may also be applied to correct for temperature effects in the elements and cables. Phase weightings similar to a lens can also be applied such that the 3D transform can produce an image focused at short range. The process is similar to beam steering a phased array radar.

A 3D image of the field of view is constructed by applying a Fourier transform. This transformation is the standard aperture to far-field transformation. The 2D surface of the monitored slope is extracted from the 3D image in a similar manner to that described in our earlier patent referred to above. The process is repeated to build a time sequence of slope images and interference maps are calculated in the manner described in our earlier patent.

Although the inventors believe the antenna has particular advantage for slope stability radar, they realize that the invention is not limited to that application and in fact will find application in any range imaging application. For instance, a similar radar could be employed to produce live images of airport runways, even in heavy fog. In this application a higher image refresh rate would be required than for the slope stability radar application.

The perimeter antenna array has a number of particular advantages for dealing with spurious signals caused by various disturbances to the radar signal. The disturbances may be due to changes in atmospheric conditions or physical activity in the field of view (for example a truck driven through the field of view of the radar). These disturbances tend to spread noise across the entire radar signal. One approach to resolving this problem is depicted in FIG. 9. The frequency of the signal applied to the antenna is stepped across the frequency band. That is at one time a certain carrier frequency (UPLO) is used together with a certain modulation frequency these in combination produce say the leftmost curve in FIG. 9. At a later time a slightly higher carrier frequency is used to generate the second curve of FIG. 9. This is done repeatedly until information has been collected across the whole band of interest. At each carrier frequency all available combinations of Rx and Tx elements could be utilized. Then data collected at each carrier frequency could be considered a separated "look" at the radar scene. Each look will have reduced signal to noise ratio and reduced range resolution compared to the case of processing together data obtained at all carrier frequencies. However the single look result is obtained over shorter time period than that from combining all carrier frequencies and thus may be useful to reject signals from targets which are moving rapidly over time such as trucks and vegetation. This frequency stepping approach also allows arbitrarily large bandwidths to be covered with little increase in electronic complexity.

An alternate approach is to employ multiple "time looks" rather than multiple "frequency looks". In this approach the radar in a short-range mode and a long-range mode. For a radar employing the antenna depicted in FIG. 3 a short-range may be up to 625 m and a long-range may be from 625 m to 2500 m. An advantage of this approach is that less bandwidth is required for long-range as there will tend to be more range spread at longer range. Thus it is possible to repeat long-range scans more often than short-range scans and thereby improve accuracy and precision. A major reason for reduced accuracy and precision at longer range is that atmosphere is major source of error and there is more atmosphere to pass through at longer range.

In the dual range operating mode there are four long-range scans taken for each short-range scan. The four long-range scans are combined to reduce SNR and then combined with the short-range scan to produce a full scan for further processing, as described in our previous patent.

In order to achieve effective performance of the radar it is important to balance the elements to correct for phase and amplitude variance. Each element, transmission line or electronic component in the synthetic aperture perimeter array radar may affect the phase and/or amplitude of the transmitted and received signal. One approach is to calibrate these out by using an antenna element 101 (or elements) positioned in front of the perimeter array 100 as shown in FIG. 10. The element 101 is held on a light framework 102 in front of and central to the array 100. The antenna element 101 does not interfere with the signal received by the array 100 in normal operation. Separate channel electronics 39 (see FIG. 3) are used for the calibration channel.

To demonstrate the operation of the perimeter antenna array a radar image was taken using a radar with a perimeter antenna array similar to that depicted in FIG. 11. FIG. 12 shows the image of a corner cube like reflector which produces a single image in the antenna field of view. The corner cube like reflector is in fact the intersection of three planar concrete walls. The image has been inverted to change black space to white space (although the scale has not been inverted). The antenna used to obtain the image of FIG. 12 differs from the depiction in FIG. 11 only in the omission of amplifiers from the sub-arrays.

It should be noted that, unlike the antenna of FIG. 3, the antenna of FIG. 11 is only two sided with a single horizontal linear array of receiver elements 110 and a single vertical linear array of transmitter elements 111. A single pole eight throw switch (SP8T) 112 directs transmission signals N through an amplifier, such as 113, to one of five SP8T switches 114 which switch the signal sequentially through an amplifier, such as 115, to a transmitter element 111. Signals reflected from a target are received by elements 110 and amplified by amplifiers, such as 116. Each element is selected by SP8T switch 117 and again amplified 118 before being switched to the core electronics by SP8T switch 119. The antenna of FIG. 11 has 35 transmitter elements and 49 receiver elements.

In operation a radar, including the perimeter antenna array of FIG. 11, is operated as described above with reference to FIG. 8 to generate the radar image of FIG. 12.

The synthetic aperture perimeter array radar has a number of advantages compared to the conventional dish radar described in our earlier patent. In our design we time multiplex transmitter elements to transmitter channels and do the same for receivers to optimise radar cost to the fairly short ranges at which we operate in comparison to military phased array radars. The radar achieves ~75% better resolution at nadir than with a similarly sized dish antenna. The entire scan is captured at once in about 30 seconds. The radar is more mechanically stable because there are no moving parts for scanning and the wind effect on the perimeter array is minimal.

Throughout the specification the aim has been to describe the invention without limiting the invention to any particular combination of alternate features.

The invention claimed is:

1. A perimeter antenna array for a synthetic aperture radar comprising:
    at least one linear array of radar transmitter elements;
    at least one linear array of radar receiver elements orthogonal to the linear array of transmitter elements;
    one or more transmitter switches for switching signals to a selection of said radar transmitter elements;
    one or more receiver switches for switching received signals from a selection of said radar receiver elements; and
    one or more processors for processing the received signals to synthesise virtual elements equi-distant from pairs of the transmitter elements and the receiver elements.

2. The perimeter antenna array of claim 1 comprising a pair of parallel linear arrays of radar transmitter elements.

3. The perimeter antenna array of claim 1 comprising a pair of parallel linear arrays of radar receiver elements.

4. The perimeter antenna array of claim 1 comprising a pair of parallel linear arrays of radar transmitter elements and a pair of parallel linear arrays of radar receiver elements arranged to substantially form a rectangle.

5. The perimeter antenna array of claim 1 wherein the elements in each linear array are equi-spaced.

6. The perimeter antenna array of claim 5 wherein the spacing between transmitter elements is different from the spacing between receiver elements.

7. The perimeter antenna array of claim 1 wherein the radiation patterns of the element antennas match with the desired scan angle of the radar.

8. The perimeter antenna array of claim 1 wherein the spacing of the antenna elements are chosen to minimise grating lobes across the radar's field of view.

9. The perimeter antenna array of claim 1 wherein the signal switched to each radar transmitter element is derived from a pseudo-noise code.

10. The perimeter antenna array of claim 1 wherein the one or more processors apply phase and/or amplitude weightings to the signals associated with the virtual elements before producing range images.

11. The perimeter antenna array of claim 1 wherein phase and/or amplitude weightings are applied to simulate scanning in azimuth and/or elevation.

12. The perimeter antenna array of claim 11 wherein azimuth is scannable in a field of view of +/−60 degrees.

13. The perimeter antenna array of claim 11 wherein elevation is scannable in a field of view of +/−30 degrees.

14. The perimeter antenna array of claim 1 wherein each linear array is formed from multiple linear sub-arrays.

15. The perimeter antenna array of claim 1 further comprising channel electronics associated with each linear array.

16. The perimeter antenna array of claim 1 further comprising a calibration element located in a field of view of the perimeter antenna array.

17. A slope monitoring radar comprising a perimeter antenna array including:
    at least one linear array of radar transmitter elements;
    at least one linear array of radar receiver elements orthogonal to the linear array of transmitter elements;
    one or more transmitter switches for switching signals to a selection of said radar transmitter elements;
    one or more receiver switches for switching received signals from a selection of said radar receiver elements; and
    one or more processors for processing the received signals to synthesise virtual elements equi-distant from pairs of the transmitter elements and the receiver elements; and
    one or more processors to analyse signals associated with said virtual elements to produce radar images.

18. A method of acquiring a radar image using a synthetic aperture radar having a perimeter antenna array including the steps of:
    generating a carrier signal;
    mixing a code signal with the carrier signal and applying the signal to each transmitter element of one or more arrays of transmitter elements;
    receiving return signals on selected receiver elements of one or more arrays of receiver elements;
    calculating virtual signals for an array of virtual elements synthesised from the transmitter elements and the receiver elements;
    calculating a 3D transform of the virtual elements to obtain a 3D radar image.

19. The method of claim 18 further including the step of extracting a 2D surface image from the 3D radar image.

* * * * *